United States Patent
Fukute et al.

(10) Patent No.: US 8,319,371 B2
(45) Date of Patent: Nov. 27, 2012

(54) ELECTRONIC DEVICE

(75) Inventors: Ryuji Fukute, Kunitachi (JP); Daisuke Enomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 12/860,282

(22) Filed: Aug. 20, 2010

(65) Prior Publication Data

US 2011/0049985 A1    Mar. 3, 2011

(30) Foreign Application Priority Data

Aug. 26, 2009   (JP) ................. 2009-195699

(51) Int. Cl.
*H02J 3/14*    (2006.01)
*G09G 3/36*    (2006.01)

(52) U.S. Cl. .................... 307/31; 345/102

(58) Field of Classification Search ............ 345/31–84, 345/87, 102
See application file for complete search history.

(56) References Cited

U.S. PATENT DOCUMENTS 6,903,716 B2* 6/2005 Kawabe et al. ............... 345/99
2007/0268236 A1* 11/2007 Morrow ....................... 345/102
2009/0021178 A1* 1/2009 Furukawa et al. ........... 315/250

FOREIGN PATENT DOCUMENTS

JP    2007-220855 A   8/2007

* cited by examiner

*Primary Examiner* — Kent Chang
*Assistant Examiner* — Chayce Bibbee
(74) *Attorney, Agent, or Firm* — Carter, DeLuca, Farrell & Schmidt LLP

(57) ABSTRACT

An electronic device includes a light emitting unit that provides backlight to a liquid crystal display unit, a communication unit that transmits video data, and a control unit that controls a current flowing from a DC-DC converter to the light emitting unit. The control unit controls the current flowing from the DC-DC converter to the light emitting unit so as to change an output voltage of the DC-DC converter from a first voltage to a second voltage which is lower than the first voltage. The first voltage is supplied to the light emitting unit and the second voltage is supplied to the communication unit.

18 Claims, 3 Drawing Sheets

ELECTRONIC DEVICE

BACKGROUND OF THE INVENTION

1. Field of the Invention

The present invention relates to an electronic device which includes a liquid crystal display unit.

2. Description of the Related Art

When a liquid crystal display unit is mounted in an electronic device such as a digital camera, a light emitting unit is necessary for providing backlight to the liquid crystal display unit. A light emitting diode (LED) has been used as a light emitting unit. Japanese Patent Application Laid-open No. 2007-220855 discusses an LED lighting circuit that includes a plurality of light emitting units for providing backlight to a liquid crystal display unit.

The LED lighting circuit discussed in Japanese Patent Application Laid-open No, 2007-220855 has a direct current (DC)-DC converter for controlling an output voltage of a power source.

However, the DC-DC converter discussed in Japanese Patent Application Laid-open No. 2007-220855 can generate a voltage necessary for the light emitting unit from the output voltage of the power source but cannot generate a voltage necessary for a circuit other than the light emitting unit from the output voltage of the power source. Therefore, the DC-DC converter discussed in Japanese Patent Application Laid-open No. 2007-220855 cannot he used as a DC-DC converter, for a configuration element other than the light emitting unit (for example, a communication unit configured to transmit video data).

SUMMARY OF THE INVENTION

The present invention directed to a device capable of generating a first voltage to be supplied to a light emitting unit for providing backlight to a liquid crystal display unit and a second voltage to be supplied to a configuration element other than the light emitting unit.

According to an aspect of the present invention, there is provided an electronic device that includes a light emitting unit that provides backlight to a liquid crystal display unit, a communication unit that transmits video data, and a control unit that controls a current flowing, from a DC-DC converter to the light emitting unit, wherein the control unit controls the current flowing from the DC-DC converter to the light emitting unit so as to change an output voltage of the DC-DC converter from a first voltage to a second voltage which is lower than the first voltage, and wherein the first voltage is supplied to the light emitting unit and the second voltage is supplied to the communication unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the attached drawings.

Figure 1:
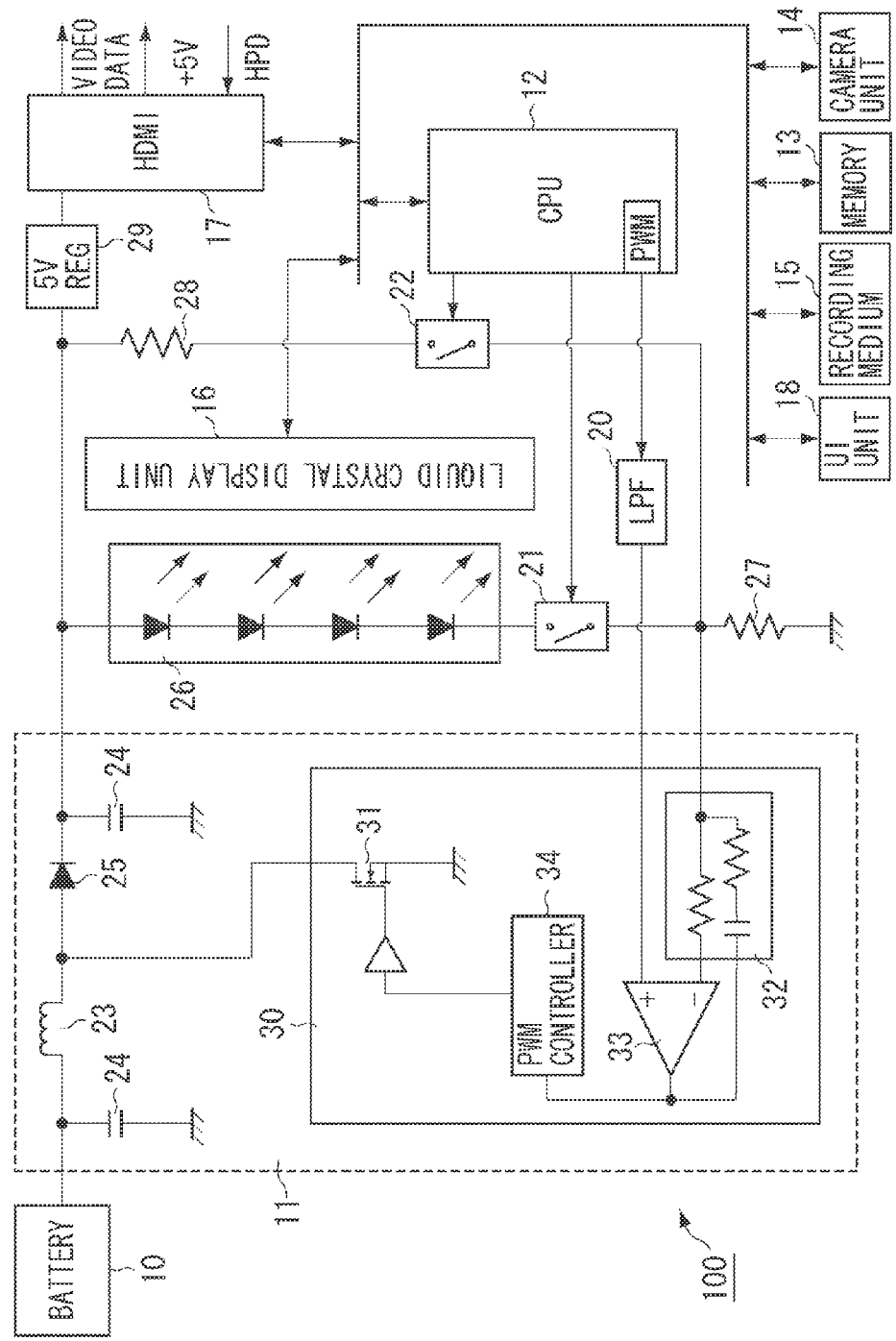
FIG. 1 is a block diagram illustrating an example of a configuration of an electronic device according to an exemplary embodiment of the present invention.

FIG. 1 is a block diagram illustrating an example of a configuration of an electronic device 100 according to an exemplary embodiment of the present invention. The electronic device 100 according to the exemplary embodiment may be configured with, for example, a digital camera, a digital video camera, and a mobile phone.

The electronic device 100 includes a battery 10, a DC-DC converter 11, a central processing unit (CPU) 12, a memory 13, a camera unit 14, a recording medium 15, a liquid crystal display unit 16, a high-definition multimedia interface (HDMI) unit 17, and a user interface (UI) unit 18.

The battery 10 is a power source of the electronic device 100 and detachable from the electronic device 100.

The DC-DC converter 11 includes a power inductor 23, a smoothing capacitor 24, a flywheel diode 25, and a feedback control unit 30. The DC-DC converter 11 functions as a constant current type DC-DC converter, and can convert an output voltage of the battery 10 to any of a first voltage V1 or a second voltage V2. In the present exemplary embodiment, the first voltage V1 is set to, for example, about 12V. Further, in the present exemplary embodiment, the second voltage V2 is set to, for example, about 6V.

The CPU 12 is a control unit configured to control operations of configuration elements of the electronic device 100 according to a control program stored in the memory 13.

The camera unit 14 captures an optical image of an object, generates video data corresponding to the optical image, and provides the generated video data to the CPU 12. The CPU 12 provides the video data from the camera unit 14 to the liquid crystal display unit 16 and the HDMI unit 17. The CPU 12 can record the video data generated by the camera unit 14 in the recording medium 15 in response to an instruction from a user. The CPU 12 compresses the video data from the camera unit 14 according to a predetermined image compression method, before recording it in the recording medium 15. Further, the CPU 12 can reproduce the video data recorded in the recording medium 15 in response to an instruction from the user. The reproduced video data from the recording medium 15 is expanded by the CPU 12, and provided to the liquid crystal display unit 16 and the HDMI unit 17.

The recoding medium 15 may include, for example, a memory card and a hard disk, and detachable from the electronic device 100. Further, the recording medium 15 can be a built-in medium in the electronic device 100.

The liquid crystal display unit 16 includes a display panel, for example, a liquid crystal panel. When the electronic device 100 is in a shooting mode, the liquid crystal display unit 16 can display video data generated by the camera unit 14. When the electronic device 100 is in a playback mode, the liquid crystal display unit 16 can display the video data reproduced from the recording medium 15.

The HDMI unit 17 is a communication unit based on a high-definition multimedia interface (HDMI). When the electronic device 100 is in the shooting mode, the HDMI unit 17 can transmit the video data generated in the camera unit 14 to a HDMI sink. When the electronic device 100 is in the playback mode, the HDMI unit 17 can transmit the video data reproduced from the recording medium 15 to the HDMI sink. The HDMI sink is an external apparatus, such as a television and a personal computer. In the present exemplary embodiment, the electronic device 100 functions as a HDMI source.

The UI unit 18 is a user interface that includes buttons and switches which are necessary to operate the electronic device 100. A user operation is input to the CPU 12 via the UI unit 18. The UI unit 18 includes a power button for switching turning ON or OFF the power source of the electronic device 100, and a mode switching button for instructing the electronic device 100 to change an operation mode of the electronic device 100 any of the shooting mode or the playback mode. The UI unit 18 also includes buttons for instructing the electronic device 100 to perform shooting, recording, reproducing, or the like.

The electronic device 100 includes a low pass filter (LPF) 20, a backlight switch 21, a switching switch 22, the power inductor 23, the smoothing capacitor 24, and the flywheel diode 25. The electronic device 100 further includes a backlight unit 26, a current setting resistor 27, a voltage setting resistor 28, and a 5V regulator 29.

The backlight switch 21 is a switch for connecting in parallel or disconnecting between the DC-DC converter 11 and the liquid crystal display unit 16. The switching switch 22 is a switch for connecting in parallel or disconnecting between the liquid crystal display unit 16 and the voltage setting resistor 28. The backlight switch 21 operates as a first switching unit, and the switching switch 22 operates as a second switching unit.

The backlight unit 26 is a light emitting unit that includes a plurality of LEDs and provides backlight to the liquid crystal display unit 16.

The 5V regulator 29 functions as a regulator for smoothing a voltage of an anode voltage of the backlight unit 26 to about 5V. The 5V regulator 29 further functions as a load switch for controlling the voltage of 12V supplied to the backlight unit 26 not to be applied to the HDMI unit 17. The voltage generated in the 5V regulator 29 (about 5V) is supplied to the HDMI unit 17. The HDMI unit 17 generates a +5V power source, and supplies the generated +5V power source to the HDMI sink via a HDMI cable.

The feedback control unit 30 includes a switch 31, a phase compensation unit 32, an error amplifier 33, and a pulse width modulation (PWM) controller 34. The feedback control unit 30 controls a current flowing, from the DC-DC converter 11 to the backlight unit 26 according to a current command value from the CPU 12. The feedback control unit 30 further performs a feedback control so as to stabilize the output voltage of the DC-DC converter 11. In the present exemplary embodiment, the output voltage of the DC-DC converter 11 is referred to as "an output voltage V0".

The output voltage V0 is described as a following formula (1).

$$V0=(VIN++Voffset)*\{1+(RL+RON)/RLED\} \quad (1)$$

In the formula (I), VIN+ is a voltage value corresponding to the current command value instructed by the CPU 12. Voffset is an input offset voltage value of the error amplifier 33. RL is a resistance value of the voltage setting resistor 28. RON is a value corresponding to an ON resistance of the switching switch 22. RLED is a resistance value of the current setting resistor 27. For example, when VIN+ is 0.06V, Voffset is 0V, RL is 1 kΩ, RON is 5Ω, and RLED is 10Ω, V0 is 6.09V.

The CPU 12 can change the output voltage V0 to any of the first voltage V1 or the second voltage V2 by controlling the current flowing, from the DC-DC converter 11 to the backlight unit 26. The CPU 12 controls the current flowing to the backlight unit 26 by a current command value output from a PWM port by the CPU 12.

When the CPU 12 changes the output voltage V0 to the first voltage (about 12V), the CPU 12 provides a PWM signal P1 corresponding to a current command value I1 to the LPF 20 via the PWM port. The current command value I1 is a current command value for changing the output voltage V0 to the first voltage V1. The LPF 20 converts the PWM signal P1 from the PWM port of the CPU 12 to a direct current voltage corresponding to the current command value I1. The direct current voltage corresponding to the current command value I1 is input in a non-inverting input terminal (+terminal) of the error amplifier 33. The feedback control unit 30 performs a feedback control according to the direct current voltage corresponding to the current command value I1. By this processing, the output voltage V0 is changed to the first voltage V1.

When the CPU 12 changes the output voltage V0 to the second voltage V2 (about 6V), the CPU 12 provides a PWM signal P2 corresponding to a current command value I2 to the LPF 20 via the PWM port. The current command value I2 is a current command value for changing the output voltage V0 to the second voltage V2. The LPF 20 converts the PWM signal P2 from the PWM port of the CPU 12 to a direct current voltage corresponding to the current command value I2. The direct current voltage corresponding to the current command value I2 is input in a non-inverting input terminal (+terminal) of the error amplifier 33. The feedback control unit 30 performs a feedback control according to the direct current voltage corresponding to the current command I2. By this processing, the output voltage V0 is changed to the second voltage V2.

When the output voltage V0 is changed to the first voltage V1, the CPU 12 causes the backlight unit 26 to be in a light emitting state. When the output voltage V0 is changed to the second voltage V2, the CPU 12 causes the backlight unit 26 to be in a light-off state. The 5V regulator 29 can normally operate even when the output voltage V0 is changed to any of the first voltage V1 or the second voltage V2, and generate the necessary voltage (about 5V) for the HDMI unit 17.

Accordingly, the electronic device 100 according to the present exemplary embodiment can share the battery 10 and the DC-DC converter with the backlight unit 26 and the HIM unit 17.

Figure 2:
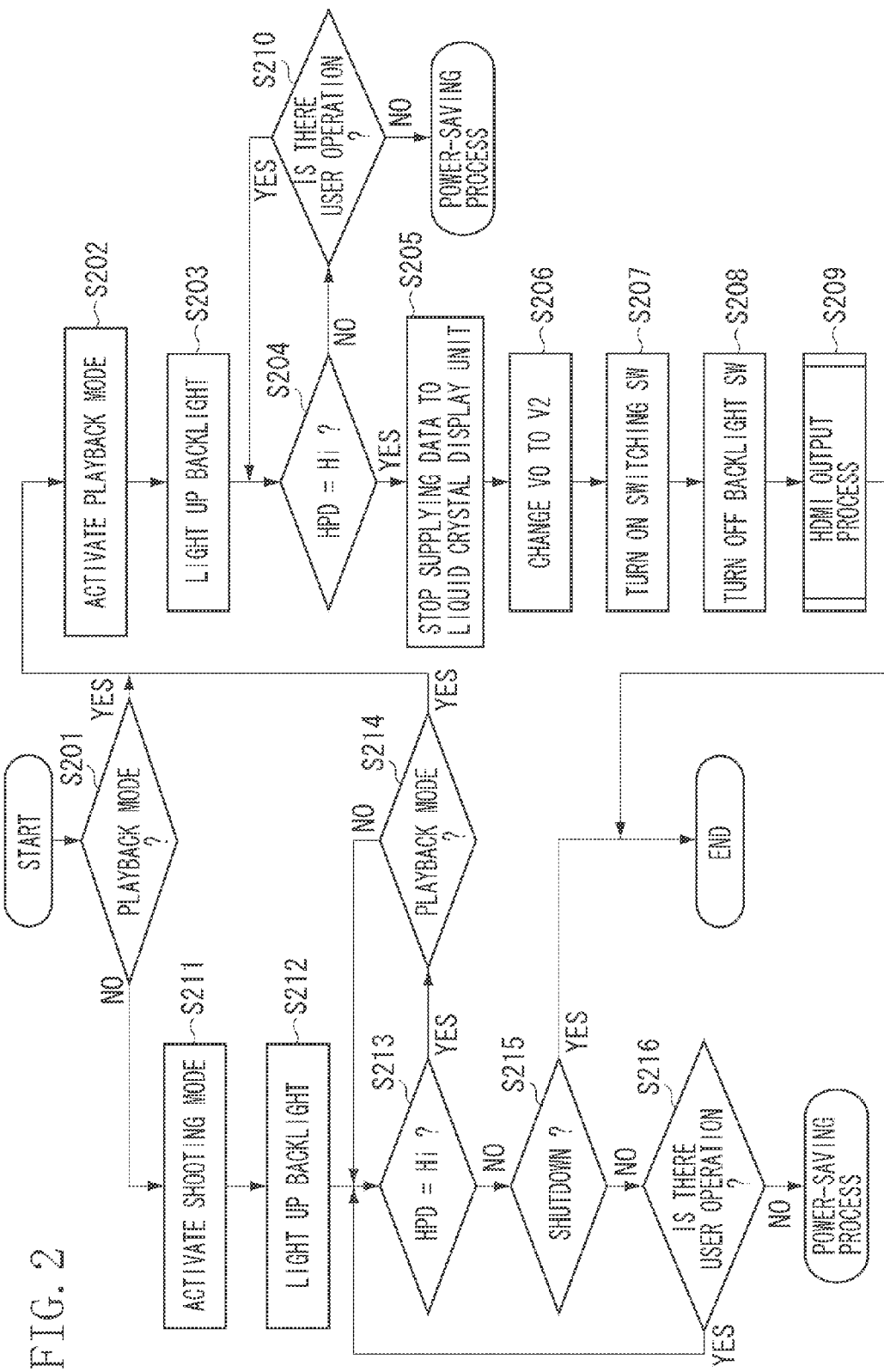
FIG. 2 is a flowchart illustrating processing procedures performed in the electronic device according to the exemplary embodiment of the present invention.

FIG. 2 is a flowchart illustrating, processing procedures performed by the electronic device 100 according to the present exemplary embodiment. The processing procedures illustrated in FIG. 2 are started, for example, when a user turns ON the power button of the electronic device 100. Further, the CPU 12 controls the processing procedures illustrated in FIG. 2 according to the control program stored in the memory 13.

In step S201, the CPU 12 determines whether a playback mode is selected. When the playback mode is selected (YES in step S201), the processing proceeds to step S202. When the playback mode is not selected but the shooting mode is selected (NO in step S201), the processing proceeds to step S211.

In step S202, the CPU 12 activates the electronic device 100 by the playback mode. When the electronic device 100 is in the playback mode, the CPU 12 can reproduce the video data recorded in the recording medium 15 in response to an instruction from the user. The video data reproduced from the recording medium 15 is provided to the liquid crystal display unit 16 and the HDMI unit 17.

In step S203, the CPU 12 outputs the PWM signal P1 from the PWM port for changing the output voltage V0 to the first voltage V1 (about 12V). The CPU 12 further turns ON the backlight switch 21 (a connection state) and turns OFF the switching switch 22 (a disconnection state) for causing the backlight unit 26 to be in the light emitting state. The switching switch 22 is turned OFF (the disconnection state) after the backlight switch 21 is turned ON (the connection state). By this processing, the backlight unit 26 becomes the light emitting state. Even when the output voltage V0 is changed to the first voltage V1, the 5V regulator 29 can convert the first voltage V1 to about 5V. The voltage of about 5V generated by the 5V regulator 29 is supplied to the HDMI unit 17. The HDMI unit 17 generates the +5V power source, and provides the generated +5V power source to the HDMI sink via the HDMI cable.

Instep S204, the CPU 12 determines whether a hot plug detect (HPD) signal provided from the HDMI sink to the electronic device 100 is high (Hi). When the HDMI sink is connectable to the electronic device 100, the HDMI signal is Hi. When the HDMI sink is not connectable to the electronic device 100, the HDMI signal is low (Low). When the CPU determines that the HDMI signal is Hi (YES in step S204), the processing proceeds to step S205. When the CPU determines that the HDMI signal is Low (NO in step S204), the processing proceeds to step S210.

In step S205, the CPU 12 stops providing the video data to the liquid crystal display unit 16. In the present exemplary embodiment, the CPU 12 executes the processing in step S205 before executing the processing in step S206 in order to make a luminance change in the backlight unit 26 to be hardly visible.

Instep S206, the CPU 12 output the PWM signal P2 from the PWM port for changing the output voltage V0 to the second voltage V2 (about 6V). Even when the output voltage V0 is changed to the second voltage V2, the 5V regulator 29 can change the second voltage V2 to about 5V. The voltage of about 5V generated by the 5V regulator 29 is supplied to the HDMI unit 17. The HDMI unit 17 generates the +5V power source, and provides the generated +5V power source to the HDMI sink via the HDMI cable. When the output voltage V0 is changed to the second voltage V2, a current flowing to the backlight unit 26 becomes so small that the backlight unit 26 becomes substantially the light-off state.

Instep S207, the CPU 12 turns ON the switching switch 22 (the connection state).

In step S208, the CPU 12 turns OFF the backlight switch 21 (the disconnection state) for causing the backlight unit 26 to be in the light-off state. By this processing, the CPU 12 interrupts a current path flowing to the backlight unit 26 and can prevent the backlight unit 26 dimly shining.

In step S209, the CPU 12 establishes a HDMI connection between the electronic device 100 and the HDMI sink and starts HDMI output process. When the HDMI output process is started, the HDMI unit 17 can transmit the video data reproduced from the recording medium 15 to an external apparatus, for example, a television and a personal computer. While the HDMI output process is executed, the backlight switch 21 is turned OFF (the disconnection state), so that the backlight unit 26 is in the light-off state. By this processing, the electronic device 100 can reduce power consumption during the HDMI connection and prolong usable time of the electronic device 100.

In step S210, the CPU 12 determines whether a period in which the CPU 12 cannot detect a user operation exceeds a predetermined time period T. The predetermined time period T can be freely set by a user via the UI unit 18, or can be a time period which cannot be freely changed by a user. As for the predetermined time period T, for example, 30 seconds, 1 minute, or 3 minutes can be considered, but the time period T is not limited to these values. When the CPU 12 determines that the period in which the CPU 12 cannot detect a user operation exceeds the predetermined time period T (NO in step S210), the CPU 12 starts "power-saving process". The "power-saving process" will be described with reference to FIG. 3. When the CPU 12 can detect the user operation before the predetermined time period T elapses (YES in step S210), the processing returns to step S204.

In step S211, the CPU 12 activates the electronic device 100 by the shooting mode. When the electronic device 100 is in the shooting mode, the camera unit 14 can capture an optical image of an object and generate video data corresponding to the optical image. The video data generated by the camera unit 14 is provided to the liquid crystal display unit 16 and the HDMI unit 17. The CPU 12 can also record the video data generated by the camera unit 14 in the recording medium 15 in response to an instruction from the user.

In step S212, the CPU 12 outputs the PWM signal P1 from the PWM port for changing the output voltage V0 to the first voltage V1 (about 12V). The CPU 12 further turns ON the backlight switch 21 (the connection state) and turns OFF the switching switch 22 (the disconnection state) for causing the backlight unit 26 to be in the light emitting state. The switching switch 22 is turned OFF (the disconnection state) after the backlight switch 21 is turned ON (the connection state). By this processing, the backlight unit 26 becomes the light emitting state. Even when the output voltage V0 is changed to the first voltage V1, the 5V regulator 29 can convert the first voltage V1 to about 5V. The voltage of about 5V generated by the 5V regulator 29 is supplied to the HDMI unit 17. The HDMI unit 17 generates the +5V power source, and provides the generated +5V power source to the HDMI sink via the HDMI cable.

In step S213, the CPU 12 determines whether the HPD signal provided from the HDMI sink to the electronic device 100 is Hi. When the CPU 12 determines that the HPD signal is Hi (YES in step S213), the processing proceeds to S214. When the CPU 12 determines that the HPD signal is Low (NO in step S213), the processing proceeds to S215.

In step S214, the CPU 12 determines whether the operation mode of the electronic device 100 is changed to the playback mode. When the CPU 12 determines that the operation mode of the electronic device 100 is changed to the playback mode (YES in step S214), the processing proceeds to step S202. When the CPU 12 determines that the operation mode of the electronic device 100 is not the playback mode but is the shooting mode (NO in step S214), the processing returns to step S213.

In step S215, the CPU 12 determines whether there is a shutdown request from the user. The shutdown request is input to the CPU 12 by turning OFF the power button. When the CPU 12 determines that the there is the shutdown request (YES in step S215), the processing in the present flowchart ends. When the CPU 12 determines that the there is not the shutdown request (NO in step S215), the processing proceeds to step S216.

In step S216, the CPU 12 determines whether the period in which the CPU 12 cannot detect the user operation exceeds the predetermined time period T. When the CPU 12 determines that the period in which the CPU 12 cannot detect a user operation exceeds the predetermined time period T (NO in step S216), the CPU 12 starts "power-saving process". When the CPU 12 can detect the user operation before the predetermined time period T elapses (YES in step S216), the processing returns to step S213.

Figure 3:
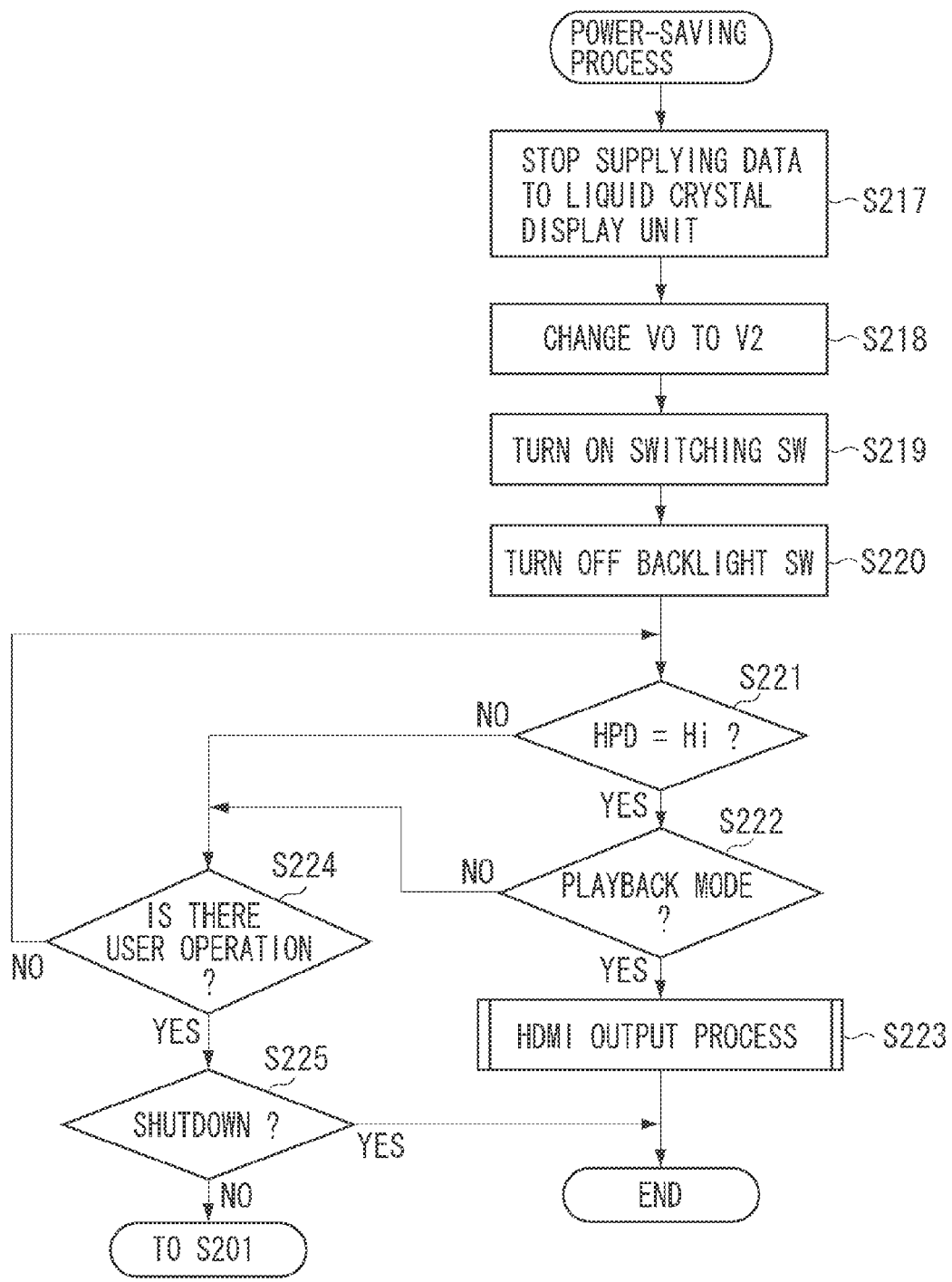
FIG. 3 is a flowchart illustrating power saving processing procedures performed in the electronic device according to the exemplary embodiment of the present invention.

FIG. 3 is a flowchart illustrating procedures of the power-saving process performed in the electronic device 100 according to the present exemplary embodiment.

In step S217, the CPU 12 stops outputting the video data to the liquid crystal display unit 16. In the present exemplary embodiment, the CPU 12 executes the processing in step S217 before executing the processing in step S218 in order to make a luminance change in the backlight unit 26 to be hardly visible.

In step S218, the CPU 12 output the PWM signal P2 from the PWM port for changing the output voltage V0 to the second voltage V2 (about 6V). Even when the output voltage V0 is changed to the second voltage V2, the 5V regulator 29 can change the second voltage V2 to about 5V. The voltage of about 5V generated by the 5V regulator 29 is supplied to the HDMI unit 17. The HDMI unit 17 generates a +5V power source, and provides the generated +5V power source to the HDMI sink via a HDMI cable.

In step S219, the CPU 12 turns ON the switching switch 22 (the connection state).

In step S220, the CPU 12 turns OFF the backlight switch 21 (the disconnection state) for causing the backlight unit 26 to be in the light-off state. By this processing, the CPU 12 interrupts a current path flowing to the backlight unit 26 and can prevent the backlight unit 26 dimly shining.

In step S221, the CPU 12 determines whether the HPD signal provided from the HDMI sink is Hi. When the CPU 12 determines that the HPD signal is Hi (YES in step S221), the processing proceeds to step S222. When the CPU 12 determines that the HPD signal is Low (NO in step S221), the processing proceeds to step S224.

In step S222, the CPU 12 determines whether the operation mode of the electronic device 100 is set to the playback mode. When the CPU 12 determines that the operation mode of the electronic device 100 is set to the playback mode (YES in step S222), the processing proceeds to step S223. When the operation mode is not set to the playback mode but set to the shooting mode (NO in step S222), the processing proceeds to step S224.

In step S223, the CPU 12 establishes the HDMI connection between the electronic device 100 and the HDMI sink, and stars the HDMI output process. When the HDMI output process is started, the HDMI unit 17 can transmit the video data reproduced from the recording medium 15 to an external apparatus, for example, a television and a personal computer. While the HDMI output process is executed, the backlight switch 21 is turned OFF (the disconnection state), so that the backlight unit 26 is in the light-off state. By this processing, the electronic device 100 can reduce power consumption during the HDMI connection and prolong usable time of the electronic device 100.

In step S224, the CPU 12 determines whether a user operation is detected. When the user operation is detected (YES in step S224), the processing proceeds to step S225. When the user operation is not detected (NO in step S224), the processing returns to step S221.

In step S225, the CPU determines whether the user operation detected in step S224 is a shutdown request. When the CPU determines that the user operation detected in step S224 is the shutdown request (YES in step S225), the processing in the present flowchart ends. When the CPU determines that the user operation detected in step S224 is not the shutdown request (NO in step S225), the processing returns to step S201.

Accordingly, the electronic device 100 according to the present exemplary embodiment can share the battery 10 and the DC-DC converter with the backlight unit 26 and the HDMI unit 17.

Further, in the electronic device 100 according to the present exemplary embodiment, when the electronic device 100 is in the playback mode and the HPD signal is Hi, the apparatus 100 can change the output voltage V0 from the first voltage V1 (about 12V) to the second voltage (about 6V). Accordingly, the electronic device 100 can reduce the power consumption during the HDMI connection, and can prolong the usable time of the electronic device 100.

In the present exemplary embodiment, a configuration in which the battery 10 and the DC-DC converter 11 are shared with the backlight unit 26 and the HDMI unit 17 is described. However, the present invention is not limited by this configuration. The HDMI unit 17 can be replaced with a communication unit other than the HDMI unit 17. For example, the unit 17 can be replaced with a communication unit based on a universal serial bus (USB). Further, the HDMI unit 17 can be replaced with configuration elements of the electronic device 100 used in other than data communication.

Further, in the present exemplary embodiment, the first voltage V1 is set, for example, about 12V. However, the value is not limited to this setting. Furthermore, in the present exemplary embodiment, the second voltage V2 is set, for example, about 6V. However, the value is not limited to this setting.

While the present invention has been described with reference to the disclosed exemplary embodiments, it is to be understood that the present invention is not limited to the disclosed exemplary embodiments. The scope of the following claims is to be accorded the broadest interpretation so as to encompass all modifications, and equivalent structures and functions.

This application claims priority from Japanese Patent Application No. 2009-195699 filed Aug. 26, 2009, which is hereby incorporated by reference herein in its entirety.

What is claimed is:

1. An electronic device comprising:
   a light emitting unit that provides backlight to a liquid crystal display unit;
   a communication unit that transmits video data to an external device;
   a control unit that controls a current flowing from a DC-DC converter to the light emitting unit;
   a resistor that is connected in parallel to the light emitting unit;
   a first switching unit that connects the light emitting unit and the DC-DC converter or disconnects between the light emitting unit and the DC-DC converter; and
   a second switching unit that connects the light emitting unit and the resistor or disconnects between the light emitting unit and the resistor,
   wherein the control unit controls a current flowing from the DC-DC converter to the light emitting unit so as to change an output voltage of the DC-DC converter from a first voltage to a second voltage which is lower than the first voltage, and
   wherein if the output voltage of the DC-DC converter is changed from the first voltage to the second voltage, the control unit causes the second switching unit to connect the light emitting unit and the resistor and causes the first switching unit to disconnect between the light emitting unit and the DC-DC converter.

2. The electronic device according to claim 1, wherein the control unit causes the first switching unit to disconnect between the light emitting unit and the DC-DC converter after causing the second switching unit to connect the light emitting unit and the resistor.

3. The electronic device according to claim 1, wherein the control unit changes the output voltage of the DC-DC converter from the first voltage to the second voltage before causing the second switching unit to connect the light emitting unit and the resistor.

4. The electronic device according to claim 1, wherein the control unit stops supplying the video data to the liquid crystal display unit before causing the second switching unit to connect the light emitting unit and the resistor.

5. The electronic device according to claim 1, wherein the communication unit is based on a high-definition multimedia interface (HDMI).

6. The electronic device according to claim 1, wherein the DC-DC converter is configured to convert an output voltage of a battery to one of the first voltage and the second voltage.

7. The electronic device according to claim 1, wherein the electronic device is configured to act as an HDMI source.

8. The electronic device according to claim 1, wherein the electronic device includes one of a digital camera and a digital video camera.

9. The electronic device according to claim 1, wherein the electronic device includes a mobile phone.

10. The electronic device according to claim 1, wherein the communication unit is based on a universal serial bus (USB).

11. The electronic device according to claim 1, wherein if the output voltage of the DC-DC converter is changed to the first voltage, the control unit causes the light emitting unit to be in a light emitting state.

12. The electronic device according to claim 1, wherein if the output voltage of the DC-DC converter is changed to the first voltage, the control unit causes the first switching unit to connect the light emitting unit and the DC-DC converter and causes the second switching unit to disconnect between the light emitting unit and the resistor.

13. The electronic device according to claim 1, wherein if the output voltage of the DC-DC converter is changed to the second voltage, the control unit causes the light emitting unit to be in a light off state.

14. The electronic device according to claim 1, wherein if the output voltage of the DC-DC converter is changed to the second voltage, the control unit causes the second switching unit to connect the light emitting unit and the resistor and causes the first switching unit to disconnect between the light emitting unit and the DC-DC converter.

15. The electronic device according to claim 1, wherein the light emitting unit shares the DC-DC converter with the communication unit.

16. The electronic device according to claim 1, wherein the first voltage is supplied to the light emitting unit and is not supplied to the communication unit.

17. The electronic device according to claim 1, further comprising:
a voltage regulator that generates a third voltage from the first voltage if the output voltage of the DC-DC converter is changed to the first voltage, and generates the third voltage from the second voltage if the output voltage of the DC-DC converter is changed to the second voltage.

18. The electronic device according to claim 17, wherein the third voltage is supplied to the communication unit.

* * * * *